United States Patent [19]

Kobayashi et al.

[11] Patent Number: 4,884,668
[45] Date of Patent: Dec. 5, 1989

[54] AUTOMATIC TRANSMISSION SHIFT CONTROL DEVICE

[75] Inventors: Satoshi Kobayashi, Hiratsuka; Koji Kato, Kosai, both of Japan

[73] Assignees: Nissan Motor Co., Ltd., Yokohama; Nissan Shatai Company, Limited, Hiratsuka; Ohi Seisakusho Co., Ltd., Yokohama; Fuji Kiko Co., Ltd., Tokyo, all of Japan

[21] Appl. No.: 214,068

[22] Filed: Jul. 1, 1988

[30] Foreign Application Priority Data

Jul. 5, 1987 [JP] Japan ................... 62-167468

[51] Int. Cl.⁴ .............................. B60K 41/28
[52] U.S. Cl. ........................ 192/4 A; 192/4 R
[58] Field of Search ............... 192/4 A, 4 R, 4 C

[56] References Cited

U.S. PATENT DOCUMENTS

| 3,942,614 | 3/1976 | Thompson | 192/4 A |
| 4,473,141 | 9/1984 | Mochida | 192/4 A |
| 4,768,610 | 9/1988 | Pagel et al. | 192/4 A |

FOREIGN PATENT DOCUMENTS 60-185750 12/1985 Japan ................... 192/4 A

*Primary Examiner*—Leslie A. Braun
*Assistant Examiner*—Nicholas Whitelaw
*Attorney, Agent, or Firm*—Foley & Lardner, Schwartz, Jeffery, Schwaab, Mack, Blumenthal & Evans

[57] ABSTRACT

A position pin is pushed down by an effort applied on a control button to disengage the position pin from a position plate when a selector lever is to be moved from a parking position to other gear positions. A bushing is mounted on a post of the selector lever for ratation but against axial movement. The bushing has at the upper end a pair of diameterically opposed notches with which the position pin is engaged when pushed down to effect the above disengagement. When an ignition key is at the "on" position and the selector lever is at the parking position, the bushing is rotated into a position where the notches are misaligned with the position pin unless a brake pedal is fully depressed, i.e., an effort applied on the control button for pushing the position pin downward is received by the upper end of the bushing whereby downward movement of the position pin for disengagement thereof from the position plate is prevented by the bushing and therefore it is impossible to move the selector lever from the parking position to other gear positions.

9 Claims, 4 Drawing Sheets

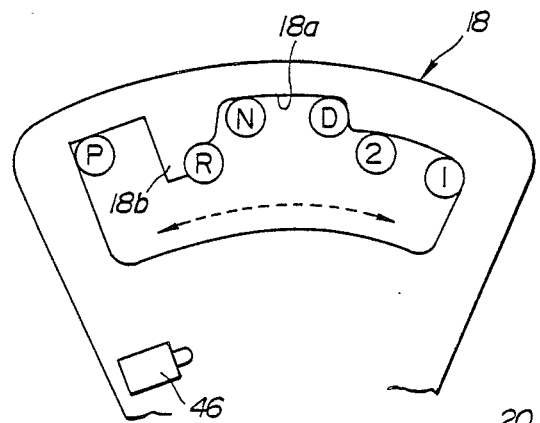
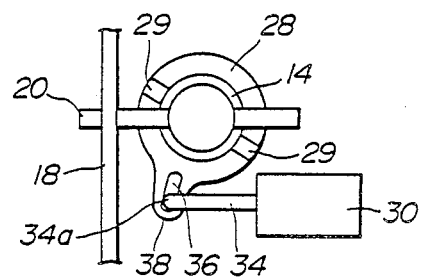
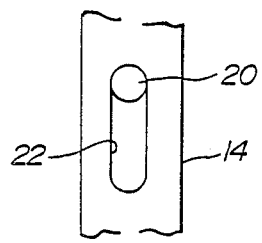
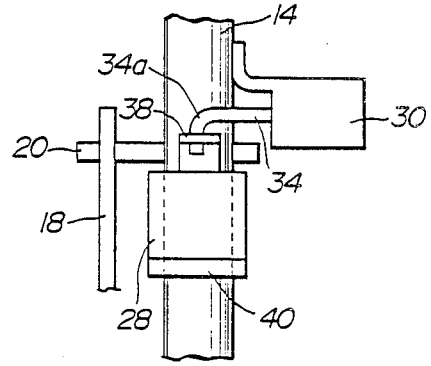

AUTOMATIC TRANSMISSION SHIFT CONTROL DEVICE

BACKGROUND OF THE INVENTION

1. Field of the Invention

The present invention relates in general to automatic transmissions and more particularly to an automatic transmission shift control device of the kind in which when the ignition key is at the "ON" position, shifting of gears from "P(parking)" to other gears cannot be attained unless the brake pedal is fully depressed.

2. Description of the Prior Art

An example of an automatic transmission shift control device of the above described kind is shown in Japanese Utility Model Provisional Publication No. 60-85750.

A problem of the prior art shift control device is that the solenoid pin of the solenoid is liable to be deformed to cause malfunction of the shift control device since if the selector lever in a locked condition is operated for shifting gears, the solenoid pin receives the operating force to resist against movement of the selector lever. In order to solve this problem, the solenoid pin may be increased in strength so as not to be deformed by such an operating force. But this causes another problem that the solenoid is large-sized to increase the manufacturing cost, weight and the design and layout restrictions.

SUMMARY OF THE INVENTION

In accordance with the present invention, there is provided an improved automatic transmission shift control device which comprises a selector lever movable into a plurality of gear positions including a parking position and having a hollow cylindrical post formed with a pair of diametrically opposed openings and a knob attached to the upper end of the post; and means for controlling movement of the selector lever.

The means includes a position plate having a profiled opening defining the gear positions, a position pin installed transversely of the post in the openings for up-and-down movement and releasably engaged in the position plate for locating the selector lever in one of the gear positions, a rod installed in the post for up-and-down movement and supporting the position pin at the lower end thereof, a push button mounted in the knob for substantially horizontal movement and cooperative with the rod to disengaging the position pin from the position plate, a bushing mounted on the post for rotation but against aixal movement and having at the upper end a pair diametrically opposed notches with which the position pin is engaged for disengaging the position pin from the position plate, a solenoid operatively connected to the bushing to rotate same selectively between a first position where the notches are aligned with the position pin and a second position where the notches are misaligned with the position pin, and an electrical circuit for controlling the solenoid in such a way that the bushing is rotated into the first position when the position pin is at the parking position and the brake pedal is fully depressed and into the second position when the position pin is at the parking position and the brake pedal is free from depression.

The above structure can solve the above noted problems inherent in the prior art device.

It is accordingly an object of the present invention to provide an improved automatic transmission shift control device which can effectively prevent its constituent part or parts from being damaged without increasing the strength of each constituent part of itself.

It is another object of the present invention to provide an improved automatic transmission shift control device of the above described character which is assuredly prevented from malfuction caused by deformation or damage of a solenoid pin or the like constitutent part.

It is a further object of the present invention to provide an improved automatic transmission shift control device of the above described character which does not require a solenoid to be large-sized and therefore does not increase the manufacturing expense, weight and the design and layout restrictions.

BRIEF DESCRIPTION OF THE DRAWINGS

FIG. 3 is a view taken in the direction of the arrow III of FIG. 1;

FIG. 4 is a view taken in the direction of the arrow IV of FIG. 1;

FIG. 5 is a view similar to FIG. 2 but showing the shift control device in a different condition;

FIG. 6 is a view taken in the direction of the arrow VI of FIG. 2;

DETAILED DESCRIPTION OF THE PREFERRED EMBODIMENTS

Figure 1:
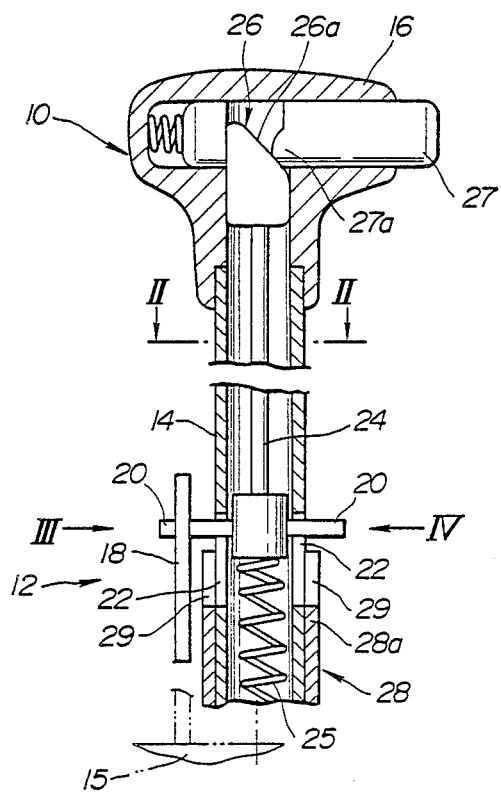
FIG. 1 is an automatic transmission shift control device according to an embodiment of the present invention.

Referring to FIGS. 1 to 7, an automatic transmission shift control device according to an embodiment of the present invention is shown as comprising a selector lever 10 and a selector lever shift position control means 12 for controlling the movement of the selector lever 10.

The selector lever 10 is swingable into various gear positions including a "P" position for shifting gears of an associated automatic transmission (not shown). The selector lever 10 consists of a hollow cylindrical post 14 pivotally mounted at the lower end on a vehicle body 15 and a knob 16 attached to the upper end of the post 14.

The selector lever shift position control means 12 includes a position plate 18 which is stationary, i.e., fixedly attached to the vehicle body 15. As shown in FIG. 3, the position plate 18 is formed with a profiled opening 18a for locating the selector lever 10 in various gear positions including a "P" position. A position pin 20 is engaged in the profiled opening 18a of the position plate 18 for positioning the selector lever 10 at one of the gear positions. The post 14 is formed with a pair of diametrically opposed openings 22 and 22 for receiving therein the position pin 20. The openings 22 and 22 are elongated axially of the post 14 for allowing up-and-down movement of the position pin 20 relative to the post 14 and the position plate 18. The position pin 20 extends across the post 14 and have opposite ends projecting outwardly from the openings 22 and 22. A rod 24 is installed in the post 14 for up-and-down movement and attached to the position pin 20 at the lower end. A slide cam 26 having a tapered cam face 26a is installed in the knob 16 and attached to the upper end of the rod 24 for up-and-down movement with same. A coil spring 25 is installed in the post 14 to urge the rod 24 and the slide cam 26 upwardly together with the position pin 20. A control button 27 is installed in the knob 16 for substantially horizontal movement and has an inner end portion 27a engaged with the tapererd cam surface 26a so that pushing the control botton 27 into the knob 16 or allowing the former to project outwardly from the latter causes downward movement or upward movement of the the slide cam 26 and the rod 24. A bushing 28 is concentrically mounted on the post 14 for rotation but against axial movement. The bushing 28 has at an upper end portion a pair of diametrically opposed notches 29 and 29 with which the position pin 20 is engaged when the selector lever 10 is moved from the "P" position into other gear positions as the "R (reverse)" position, "N(neutral)" position, "D (drive)" position, "1(first gear)" position and the "2(second gear)" position. In other words, in order to shift the selector lever 10 from the "P" position to other gear positions it is necessary to move the position pin 20 into the lower end portions of the openings 22 and 22. To attain this, it is inevitable for the position pin 20 to be moved into the notches 29 and 29.

Figure 2:
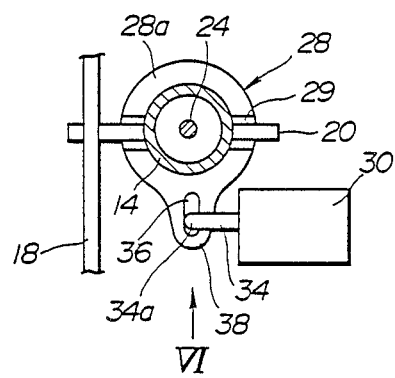
FIG. 2 is a sectional view taken along the line II—II of FIG. 1.

A solenoid 30 is connected to the bushing 28 for rotating the same in such a way that when the position pin 20 is at the "P" position the bushing 28 is rotated into a position where the notches 29 and 29 are misaligned with the position pin 20 as shown in FIG. 5 and that even when the position pin 20 is at the "P" position the bushing 28 can be moved into a position where the notches 29 and 29 are aligned with the position pin 20 as shown in FIG. 2 by fully depressing the brake pedal and thereby causing a stop switch 32 ( refer to FIG. 7) to be turned "ON" to energize the solenoid 30. Indicated by the reference numeral 34 is a solenoid pin projectable from and retractable into the solenoid 30 and has an end 34a engaged in a slot 36 formed in an outer peripheral projection 38 of the bushing 28. Indicated by the reference numeral 40 is a bushing support 40 secured to the post 14 for supporting thereon the bushing 28.

Figure 7:
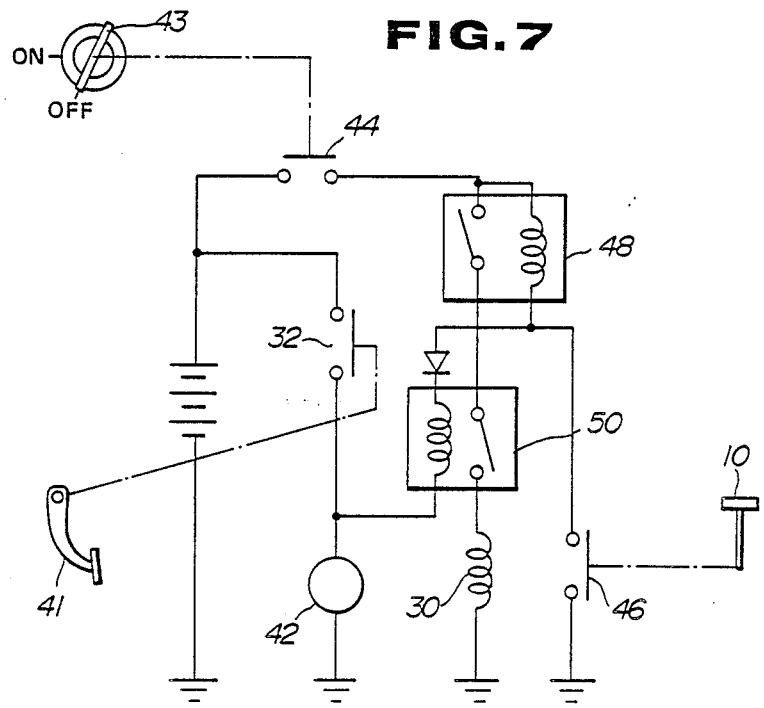
FIG. 7 is a wiring diagram of an electric circuit for controlling the operation of a solenoid employed in the shift control device of FIG. 1

The rotation of the bushing 30 is controlled by an electric circuit shown in FIG. 7. The electric circuit includes the aforementioned stop switch 32 which is closed when a brake pedal 41 is fully depressed and opened when released from the depression. The stop switch 32 is connected in series with a d.c. source and a stop lamp 42. An ignition key position detecting switch 44 is closed when an ignition key 43 is at the "ON" position and closed when at the "OFF" position. A selector lever position detecting switch 46 is closed when the selector lever 10 is at the "P" position and opened when out of the "P" position. The switch 46 is connected in series with the ignition switch 44 which is disposed between the d.c. source and the switch 46. The stop switch is in parallel relation with the switches 44 and 46. A first relay 48 is disposed between the switches 44 and 46 and connected in series with same. The solenoid 30 is connected in series with the switch 44 and the first relay 48 and in parallel with the switches 32 and 46. A second relay is disposed between the first relay 48 and the solenoid 30.

With the foregoing structure, when the ignition key is at the "ON" position, shifting of the selector lever 10 from the "P" position to other gear positions is prevented unless the brake pedal 41 is fully depressed. In this instance, the ignition key position detecting switch 44 and the selector lever position detecting switch 46 are closed thus allowing the relays 48 and 50 to be closed. The solenoid 30 is energized to allow the solenoid pin 34 to project outwardly therefrom. By this, the bushing 28 is rotated into a position where the notches 29 and 29 are misaligned with the position pin 20. In order to shift the selector lever 10 from the "P" position to other gear positions as "R", "N", "D", "2" and "1", it is necessary to push the control button 27 into the knob 16 for thereby pushing the position pin 20 down into the lower end portions of the openings 22 and 22 so that the position pin 20 can clear a stopper portion 18b of the profiled opening 18a of the position plate 18. However, the downward movement of the position pin 20 in response to the movement of the control button 27 inwardly of the knob 16 is prevented by the bushing 28, i.e., the control button 27 cannot be pushed into the knob 16 sufficiently or by a predetermined amount since the notches 29 and 29 are misaligned with the position pin 20 to make the position pin 20 abut upon the upper end of the bushing 28.

In the above, it will be understood that the 0 force with which the position pin 20 is subjected during the above prevention of gear shifting is sufficiently small since the position pin 20 receives only the force which is transferred from the control button 27 through the slide cam 26. The force applied to the control button is not so large. Further, the force received by the position pin 20 is smaller than the force applied to the control button 27 since it is reduced during transmission from the control button 27 to the slide cam 26 by the effect of the tapered cam surface 26a.

In order to shift the selector lever 10 from the "P" position to other gear positions, the brake pedal 41 is fully depressed. In response to full depression of the brake pedal 41, the stop switch 32 is closed, thus allowing the solenoid 30 to be deenergized since there is no current through the relay 50. The solenoid pin 34 thus retracts into the solenoid 30, rotating the bushing 28 into a position where the notches 29 and 29 are aligned with the position pin 20. Pushing the control button 27 into the knob 16 moves the position pin 20 into the lower end portions of the openings 22 and 22, whereby to make it possible for the position pin 20 to clear the stopper portion 18b of the profiled opening 18a of the position plate 18. The selector lever 10 therefore can be moved from the "P" position to other gear positions.

Figure 8:
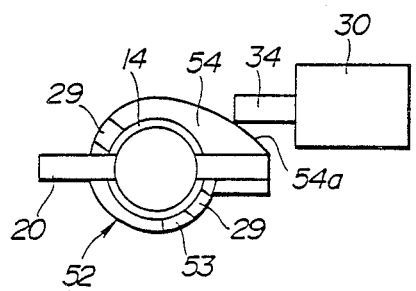
FIG. 8 is a view similar to FIG. 5 but showing another embodiment of the present invention.
Figure 9:
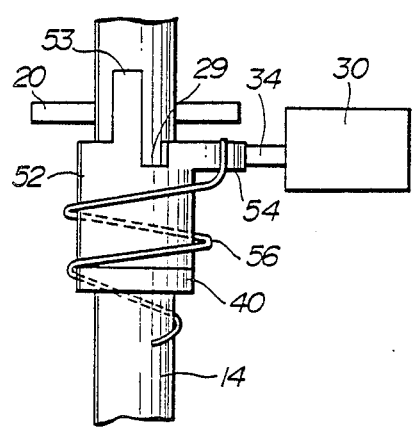
FIG. 9 is a view similar to FIG. 6 but showing the embodiment of FIG. 8.
Figure 10:
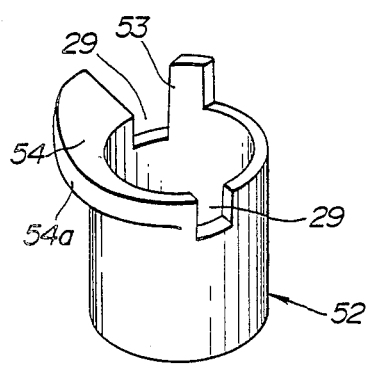
FIG. 10 is a perspective view of a bushing employed in the embodiment of FIG. 8.

Referring to FIGS. 8 to 10, another embodiment of the present invention comprises a bushing 52 mounted on the post 14 for rotation but against axial movement. The bushing 52 has at the upper end a stopper 53 in the form of an upstanding projection. The bushing 52 also has an outer peripheral projection 54 formed with a cam surface 54 of a parabolic curvature with which the end 14a of the solenoid pin 34 is engaged. A coil spring 56 is placed around the bushing 52 and attached at the opposite ends to the post 14 and the projection 54 so that the bushing 52 is urged in the anticlockwise direction when viewed in FIG. 8.

With this structure, when the brake pedal 41 is fully depressed to close the stop switch 32 and deenergize the solenoid 30, the solenoid pin 34 retracts allowing the bushing 52 to rotate under the bias of the spring 56 into a position where the notches 29 and 29 are aligned with the position pin 20. In this instance, the stopper 53 is brought into abutment upon the position pin 20 under the bias of the spring 56 so that the notches 29 and 29 are assuredly aligned with the position pin 20. When the brake pedal 41 is free from depression to allow the stop switch 32 to open, the solenoid 30 is energized to allow the solenoid pin 34 to project therefrom, thus rotating the bushing 52 into a position shown in FIG. 8, i.e., into a position where the notches 29 and 29 are misaligned with the position pin 20.

Figure 11:
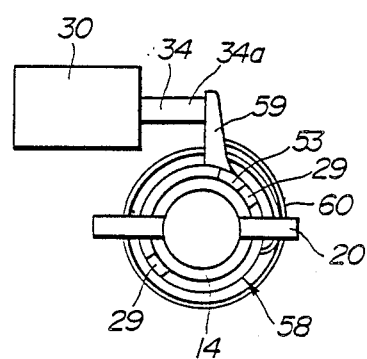
FIG. 11 is a view similar to FIG. 5 but showing a further embodiment of the present invention.
Figure 12:
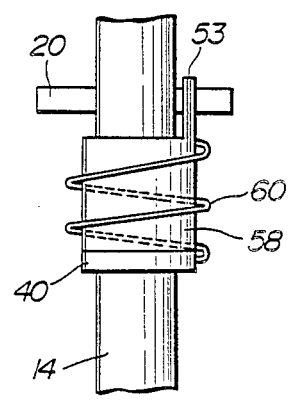
FIG. 12 is a view similar to FIG. 6 but showing the embodiment of FIG. 11.

Referring to FIGS. 11 and 12, a further embodiment of the present invention comprises a bushing 58 mounted on the post 14 for rotation but against axial movement. The bushing 58 has an outer peripheral projection 59 in contact with the end 34a of the solenoid pin 34. The bushing 58 also has at the upper end thereof an upstanding stopper 53 upon which the position pin 20 abuts when the solenoid 30 is deenergized to allow the solenoid pin 34 to project to push the projection 59 against the bias of a spring 60, thus rotating the bushing 58 into a position where the notches 29 and 29 are aligned with the position pin 20. When the solenoid 30 is energized, the solenoid pin 34 retracts allowing the bushing 58 to be rotated under the bias of the spring 60 into a position where the notches 29 and 29 are misaligned with the position pin 20 as shown in FIG. 11. The spring 60 is placed around the bushing 58 and attached at the opposite ends to the bushing 58 and the bushing support 40 in such a manner that the bushing 58 is urged in the anticlockwise direction when viewed in FIG. 11. The projection and retraction of the solenoid pin 34 in this embodiment in response to energization and deenergization of the solenoid 30 is reverse to that in the previous embodiments.

What is claimed is:

1. An automatic transmission shift control device for a vehicle having a brake pedal, comprising:
    a selector lever movable into a plurality of gear positions including a parking position and having a hollow cylindrical post having a pair of diametrically opposed openings and a knob attached to an upper end of said post; and
    means for controlling movement of said selector lever;
    said means including a position plate having a profiled opening defining said gear positions, a position pin installed transversely of said post in said openings for up-and-down movement and releasably engaged in said position plate for positioning said selector lever at one of said gear positions, a rod installed in said post for up-and-down movement and supporting said position pin at the lower end thereof, a control button mounted in said knob for substantially horizontal movement and cooperative with said rod to disengage said position pin from said position plate, a bushing mounted on said post for rotation but against axial movement and having at the upper end a pair diametrically opposed notches with which said position pin is engaged for disengaging said position pin from said position plate, a solenoid operatively connected to said bushing to rotate same selectively between a first position where said notches are aligned with position pin and a second position where said notches are misaligned with said position pin, and an electrical circuit for controlling said solenoid in such a way that said bushing is rotated into said first position when said position pin is at said parking position and the brake pedal is fully depressed and into said second position when said position pin is at said parking position and the brake pedal is free from depression.

2. An automatic transmission shift control device as set forth in claim 1 wherein said means further comprises a slide cam installed in said knob for up-and-down movement, said slide cam being attached to the upper end of said rod to move together therewith and having a tapered cam surface with which an inner end of said push button is engaged so that substantially horizontal movement of said push button is converted into up-and-down movement of said rod.

3. An automatic transmission shift control device as set forth in claim 1 wherein said electric circuit comprises an ignition key position detecting switch which is closed when an ignition key is at an "ON" position and opened when the ignition key is at an "OFF" position, a selector lever position detecting switch which is closed when said selector lever is at the parking position and opened when said selector lever is at a gear position other than the parking position, and a stop switch which is closed when the brake pedal is fully depressed and opened when the brake pedal is free from depression, said solenoid being energized only when said ignition key position detecting switch, said selector lever position detecting switch and said stop switch are closed.

4. An automatic transmission shift control device as set forth in claim 3 wherein said ignition key position detecting switch and said selector lever position detecting switch are connected in series with each other and in parallel with said stop switch, said solenoid being connected in series with said ignition switch and in parallel with said selector lever position detecting switch and said stop switch.

5. An automatic transmission shift control device as set forth in claim 4 wherein said electric circuit further comprises a first relay disposed between said ignition key position detecting switch and said selector lever position detecting switch and connected in series with same, and a second relay disposed between said first relay and said solenoid and connected in series with same.

6. An automatic transmission shift control device as set forth in claim 1 wherein said bushing has a peripheral projection formed with a slot and said solenoid has a solenoid pin engaged at an end in said slot.

7. An automatic transmission shift control device as set forth in claim 1 wherein said means further comprising a spring for urging said bushing in a predetermined rotational direction, said bushing having at the outer peripheral thereof a cam surface of a parabolic curvature with which said solenoid pin is engaged so that axial movement of said solenoid pin causes said bushing to rotate between said first and second positions thereof under and against the bias of said spring.

8. An automatic transmission shift control device as set forth in claim 7 wherein said bushing has at the upper end thereof an upstanding stopper which is brought into engagement with said position pin under the bias of said spring when said bushing is rotated into said first positon 9. An automatic transmission shift control device as set forth in claim 1 wherein said bushing has an outer peripheral projection in contact with an end of said solenoid pin. said means further comprising a spring for urging said bushing in a predetermined rotational direction and said peripheral projection against said solenoid pin, said bushing being rotated into said second position under the bias of said spring when said solenoid is engergized to allow said solenoid pin to retract and into said first position against the bias of said spring when said solenoid is deenergized to allow said solenoid pin to project.

* * * * *